US011614970B2

(12) United States Patent
Huang et al.

(10) Patent No.: US 11,614,970 B2
(45) Date of Patent: Mar. 28, 2023

(54) HIGH-THROUGHPUT PARALLEL DATA TRANSMISSION

(71) Applicant: MicroStrategy Incorporated, Vienna, VA (US)

(72) Inventors: Ying Huang, Zhejiang Province (CN); Jun Xu, Hangzhou (CN); Ruidan Zhu, Hangzhou (CN)

(73) Assignee: MicroStrategy Incorporated, Vienna, VA (US)

( * ) Notice: Subject to any disclaimer, the term of this patent is extended or adjusted under 35 U.S.C. 154(b) by 222 days.

(21) Appl. No.: 16/705,630

(22) Filed: Dec. 6, 2019

(65) Prior Publication Data

US 2021/0173714 A1 Jun. 10, 2021

(51) Int. Cl.
*H04L 67/06* (2022.01)
*H04L 67/10* (2022.01)
*G06F 16/182* (2019.01)
*G06F 9/50* (2006.01)
*G06F 16/14* (2019.01)

(52) U.S. Cl.
CPC .......... *G06F 9/5027* (2013.01); *G06F 16/148* (2019.01); *G06F 16/182* (2019.01); *H04L 67/06* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 4,769,772 A | 9/1988 | Dwyer | |
| 5,414,469 A | 5/1995 | Gonzales et al. | |
| 5,590,319 A | 12/1996 | Cohen et al. | |
| 6,442,522 B1 | 8/2002 | Carberry et al. | |
| 6,701,294 B1 | 3/2004 | Ball et al. | |
| 7,181,444 B2 | 2/2007 | Porter et al. | |
| 7,356,840 B1 | 4/2008 | Bedell | |
| 7,827,125 B1 | 11/2010 | Rennison | |
| 8,024,666 B2 | 9/2011 | Thompson | |
| 8,103,608 B2 | 1/2012 | Green et al. | |

(Continued)

OTHER PUBLICATIONS

'ProPublica' [online], "Chapter 1. Using Google Refine to Clean Messy Data," Nguyen, Dec. 30, 2010, [retrieved on Sep. 2, 2015], Retrieved from the Internet: URL<https://www.propublica.org/nerds/item/using-google-refine-for-data-cleaning>, 10 pages.

(Continued)

*Primary Examiner* — Mohamed Ibrahim
(74) *Attorney, Agent, or Firm* — Fish & Richardson P.C.

(57) ABSTRACT

Methods, systems, and apparatus, including computer programs encoded on computer-storage media, for high-throughput parallel data transmission. In some implementations, a data connector module is configured to provide an application server with access to a data set of unstructured data. One or more computers receive a first request associated with a first application or service, and data identifying a second application or service different from the first application or service. A plurality of second requests are generated and distributed to processing nodes to generate results for the second requests. Result data derived from the results for the second requests to the second application or service.

18 Claims, 8 Drawing Sheets

(56) References Cited

U.S. PATENT DOCUMENTS

| | | |
|---|---|---|
| 8,296,475 B2 | 10/2012 | Kottomtharayil |
| 8,402,052 B2 | 3/2013 | Sano et al. |
| 8,495,627 B2 | 7/2013 | Barsness et al. |
| 8,695,009 B2 | 4/2014 | Vojnovic et al. |
| 8,825,720 B1 | 9/2014 | Xie et al. |
| 8,886,631 B2 | 11/2014 | Abadi et al. |
| 8,924,978 B2 | 12/2014 | Meng et al. |
| 8,996,523 B1 | 3/2015 | Fisher |
| 9,092,266 B2 | 7/2015 | Boutin et al. |
| 9,128,763 B2 | 9/2015 | Sarkar et al. |
| 9,129,448 B2 | 9/2015 | Bekmambetov et al. |
| 9,141,611 B2 | 9/2015 | Crook |
| 9,183,540 B2 | 10/2015 | Eberlein et al. |
| 9,229,950 B2 | 1/2016 | Chen et al. |
| 9,411,853 B1 | 8/2016 | Dovrtel et al. |
| 9,411,861 B2 | 8/2016 | Bestgen et al. |
| 9,456,049 B2 | 9/2016 | Soundararajan et al. |
| 9,514,220 B1 | 12/2016 | Wright |
| 9,665,662 B1 | 5/2017 | Gautam et al. |
| 9,672,122 B1 | 6/2017 | Gandhi et al. |
| 10,095,759 B1 | 10/2018 | Cappiello |
| 10,108,676 B2 | 10/2018 | Li |
| 10,223,376 B2 | 3/2019 | Lee et al. |
| 10,255,320 B1 | 4/2019 | Cappiello |
| 10,296,617 B1 | 5/2019 | Zhang et al. |
| 10,303,557 B2 | 5/2019 | Pradhan et al. |
| 10,635,669 B1 | 4/2020 | Cappiello |
| 10,740,005 B1* | 8/2020 | Ives .................. G06F 3/067 |
| 10,877,669 B1 | 12/2020 | Sivasubramanian et al. |
| 11,080,244 B2* | 8/2021 | Phelan .............. G06F 16/182 |
| 11,386,085 B2 | 7/2022 | Luo et al. |
| 2002/0032676 A1 | 3/2002 | Reiner et al. |
| 2003/0233403 A1 | 12/2003 | Bae et al. |
| 2004/0019678 A1* | 1/2004 | St. Pierre ............. G06F 9/547 |
| | | 709/225 |
| 2004/0165780 A1 | 8/2004 | Maki et al. |
| 2005/0050036 A1 | 3/2005 | Araki |
| 2005/0091283 A1 | 4/2005 | Debique et al. |
| 2005/0102371 A1 | 5/2005 | Aksu |
| 2005/0187977 A1 | 8/2005 | Frost |
| 2005/0203878 A1 | 9/2005 | Brill et al. |
| 2006/0004674 A1 | 1/2006 | Tesser |
| 2006/0053171 A1 | 3/2006 | Eldridge et al. |
| 2006/0155687 A1 | 7/2006 | Chou |
| 2006/0155688 A1 | 7/2006 | Chou |
| 2006/0227970 A1 | 10/2006 | Nakano |
| 2007/0112754 A1 | 5/2007 | Haigh et al. |
| 2007/0130131 A1 | 6/2007 | Porter et al. |
| 2007/0208690 A1 | 9/2007 | Schneider et al. |
| 2007/0245383 A1 | 10/2007 | Bhide et al. |
| 2008/0005677 A1 | 1/2008 | Thompson |
| 2008/0033915 A1 | 2/2008 | Chen et al. |
| 2008/0033925 A1 | 2/2008 | Richards et al. |
| 2008/0155197 A1 | 6/2008 | Li et al. |
| 2008/0172362 A1 | 7/2008 | Shacham |
| 2008/0189655 A1 | 8/2008 | Kol et al. |
| 2008/0201304 A1 | 8/2008 | Sue |
| 2008/0250021 A1 | 10/2008 | Boys et al. |
| 2009/0104123 A1 | 4/2009 | Yang et al. |
| 2009/0112949 A1 | 4/2009 | Ergan et al. |
| 2009/0164412 A1 | 6/2009 | Bestgen et al. |
| 2009/0287673 A1 | 11/2009 | Chronister et al. |
| 2009/0327883 A1 | 12/2009 | Robertson et al. |
| 2010/0131254 A1 | 5/2010 | Rubin et al. |
| 2011/0040733 A1 | 2/2011 | Sereinoglu et al. |
| 2011/0137850 A1 | 6/2011 | Mourey et al. |
| 2011/0225288 A1 | 9/2011 | Easterday et al. |
| 2011/0264657 A1 | 10/2011 | Hoffman et al. |
| 2011/0302583 A1 | 12/2011 | Abadi et al. |
| 2011/0314057 A1 | 12/2011 | Banfer |
| 2012/0016678 A1 | 1/2012 | Gruber et al. |
| 2012/0023101 A1 | 1/2012 | Heimendinger et al. |
| 2012/0084296 A1 | 4/2012 | Waters |
| 2012/0102053 A1 | 4/2012 | Barrett et al. |
| 2012/0136649 A1 | 5/2012 | Freising et al. |
| 2012/0179714 A1 | 7/2012 | Chandhok et al. |
| 2012/0226804 A1 | 9/2012 | Raja et al. |
| 2012/0233191 A1 | 9/2012 | Ramanujam |
| 2013/0013552 A1 | 1/2013 | Eshleman et al. |
| 2013/0013883 A1 | 1/2013 | Kottomtharayil et al. |
| 2013/0018903 A1 | 1/2013 | Taranov |
| 2013/0097177 A1 | 4/2013 | Fan et al. |
| 2013/0132967 A1* | 5/2013 | Soundararajan ........ H04L 67/06 |
| | | 709/201 |
| 2013/0166547 A1 | 6/2013 | Pasumarthi et al. |
| 2013/0166573 A1 | 6/2013 | Vaitheeswaran et al. |
| 2013/0191418 A1 | 7/2013 | Martin, Jr. et al. |
| 2013/0241926 A1 | 9/2013 | Asaria et al. |
| 2013/0254155 A1 | 9/2013 | Thollot et al. |
| 2013/0275360 A1 | 10/2013 | Kharod et al. |
| 2014/0025626 A1 | 1/2014 | Mefford et al. |
| 2014/0040306 A1 | 2/2014 | Peregrine et al. |
| 2014/0095480 A1 | 4/2014 | Marantz et al. |
| 2014/0101139 A1 | 4/2014 | van Gemert et al. |
| 2014/0149446 A1 | 5/2014 | Kachman-Beauger et al. |
| 2014/0149839 A1 | 5/2014 | Bedard et al. |
| 2014/0195558 A1 | 7/2014 | Murthy et al. |
| 2014/0280032 A1 | 9/2014 | Kornacker et al. |
| 2014/0280372 A1 | 9/2014 | Huras et al. |
| 2014/0310712 A1 | 10/2014 | Meng et al. |
| 2014/0358845 A1 | 12/2014 | Mundlapudi et al. |
| 2014/0365429 A1 | 12/2014 | Wagner et al. |
| 2014/0372427 A1 | 12/2014 | Lehmann et al. |
| 2015/0006518 A1 | 1/2015 | Baumgartner et al. |
| 2015/0135255 A1 | 5/2015 | Theimer et al. |
| 2015/0169688 A1 | 6/2015 | Halverson et al. |
| 2015/0178052 A1 | 6/2015 | Gupta et al. |
| 2015/0193719 A1 | 7/2015 | Than et al. |
| 2015/0212663 A1 | 7/2015 | Papale et al. |
| 2015/0242856 A1 | 8/2015 | Dhurandhar et al. |
| 2015/0248501 A1 | 9/2015 | Kamel et al. |
| 2015/0317362 A1 | 11/2015 | Teranishi |
| 2015/0347450 A1* | 12/2015 | Phelan .................. G06F 9/541 |
| | | 707/825 |
| 2015/0355989 A1 | 12/2015 | Hayden et al. |
| 2016/0048584 A1 | 2/2016 | Valentin |
| 2016/0105328 A1 | 4/2016 | Cooper et al. |
| 2016/0154852 A1 | 6/2016 | Chen et al. |
| 2016/0239487 A1 | 8/2016 | Potharaju et al. |
| 2017/0039209 A1 | 2/2017 | Gupta et al. |
| 2017/0039281 A1 | 2/2017 | Venkata et al. |
| 2017/0220633 A1 | 8/2017 | Porath et al. |
| 2017/0270209 A1 | 9/2017 | Mueller et al. |
| 2018/0081798 A1* | 3/2018 | Alcantara ........... G06F 12/0246 |
| 2018/0157738 A1 | 6/2018 | Johnson |
| 2018/0182398 A1 | 6/2018 | Halstvedt et al. |
| 2018/0308149 A1 | 10/2018 | Guo et al. |
| 2019/0121802 A1 | 4/2019 | Venkataraman et al. |
| 2019/0310977 A1 | 10/2019 | Pal et al. |
| 2019/0384759 A1 | 12/2019 | Cappiello et al. |
| 2020/0012638 A1 | 1/2020 | Luo et al. |
| 2020/0019546 A1 | 1/2020 | Luo et al. |
| 2020/0250191 A1 | 8/2020 | Cappiello |
| 2021/0157813 A1 | 5/2021 | Hammad et al. |
| 2022/0284014 A1 | 9/2022 | Luo et al. |

OTHER PUBLICATIONS

'Wikipedia' [online], "OpenRefine," last updated Jul. 15, 2015, [retrieved on Sep. 2, 2015], Retrieved from the Internet: URL<https://en.wikipedia.org/wiki/OpenRefine>, 4 pages.

www2.microstrategy.com [online], "Installing MicroStrategy Hadoop Gateway", 2017, retrieved on Mar. 23, 2020, retrieved from URL <https://www2.microstrategy.com/producthelp/10.4/InstallConfig/Content/InstallationConfig/installing_microstrategy_hadoop_gateway.htm>, 8 pages.

[No Author Listed], "Deploy Enterprise Analytics Applications Using the Native Hadoop Gateway," PowerPoint, Dec. 13, 2017, 41 pages.

Borthakur, "HDFS Architecture Guide," The Apache Software Foundation, 2006, 13 pages.

community.microstrategy.com [online], "Articles KB275774: How to connect the MicroStrategy Enterprise Platform 10.x to Apache

(56) References Cited

OTHER PUBLICATIONS

Spark SQL," May 11, 2017, retrieved on Mar. 23, 2020, retrieved from URL <https://community.microstrategy.com/s/article/KB275774-How-to-connect-the-MicroStrategy-Enterprise-Platform-10?language=en_US>, 5 pages.
community.microstrategy.com [online], "Connecting to Hadoop with MicroStrategy," Jun. 7, 2017, retrieved on Mar. 23, 2020, retrieved from URL <https://communitymicrostrategy.com/s/article/Connecting-to-Hadoop-with-MicroStrategy?language=en_US>, 3 pages.
community.microstrategy.com [online], "KB248914: Overview and installation of the MicroStrategy 10.0-10.5 Secure Enterprise Platform Hadoop Gateway (Big Data Engine)," May 30, 2017. retrieved on Mar. 23, 2020, retrieved from URL <https://community.microstrategy.com/s/article/KB248914-Overview-and-installation-of-the-MicroStrategy-10?language=en_US>, 6 pages.
doc-archives.microstrategy.com [online], "Analyzing Big Data in MicroStrategy," Oct. 7, 2016, retrieved on Mar. 23, 2020, retrieved from URL <https://doc-archives.microstrategy.com/producthelp/10.7/WebUser/WebHelp/Lang_1033/Content/mstr_big_data.htm>, 21 pages.
doc-archives.microstrategy.com [online], "Introduction to the MicroStrategy Hadoop Gateway," 2019, retrieved on Mar. 23, 2020, retrieved from URL <https://doc-archives.microstrategy.com/producthelp/10.11/InstallConfig/WebHelp/Lang_1033/Content/hadoop_gateway_intro.htm>, 2 pages.
Eltabakh, "Hadoop: A Framework for DataIntensive Distributed Computing", PowerPoint presentation at Worcester Polytechnic Institute, Spring 2012, 28 pages.
en.wikipedia.org [online], "Apache Hadoop," Mar. 2019, retrieved on Mar. 23, 2020, retrieved from URL <https://en.wikipedia.org/wiki/Apache_Hadoop>, 13 pages.
en.wikipedia.org [online], "Apache Spark," May 2019, retrieved on Mar. 23, 2020, retrieved from URL <https://en.wikipedia.org/wiki/Apache_Spark>, 8 pages.
en.wikipedia.org [online], "Scala (programming language)" Jan. 2019, retrieved on Mar. 23, 2020, retrieved from URL <https://en.wikipedia.org/wiki/Scala_(programming_language)>, 29 pages.
Maru et al., "Tapping Into Hadoop and NoSQL Data Sources with MicroStrategy," PowerPoint Presentation at Microstratergy World 2014, 2014, 38 pages.
Shvachko et al., "The Hadoop Distributed File System," IEEE, 2010, 10 pages.
towardsdatascicence.com [online], "Big Data From B to A: The Hadoop Distributed Filesystem—HDFS," Nov. 25, 2019, retrieved on Mar. 23, 2020, retrieved from URL <https://towardsdatascience.com/big-data-from-b-to-a-the-hadoop-distributed-filesystem-hdfs-992612cbf8aa>, 6 pages.
www.ibm.com [online], "HDFS Scale an Apache Hadoop cluster to hundreds of nodes with the Hadoop Distributed File System (HDFS)" May 28, 2019, retrieved on Mar. 24, 2020, retrieved from URL <https://www.ibm.com/analytics/hadoop/hdfs>.
www.microstrategy.com [online], "What's new in MicroStrategy 10.11" Apr. 10, 2018, retrieved on Mar. 23, 2020, retrieved from URL <https://www.microstrategy.com/getmedia/5466690f-f8la-4cf4-8fl6-e0dlfa220690/MicroStrategy-release-notes_10-11>, 36 pages.
www.theta.co.nz [online], "MicroStrategy version 10 enables big data engine support," Nov. 18, 2015, retrieved on Mar. 23, 2020, retrieved from URL <https://www.theta.co.nz/news-blogs/tech-blog/microstrategy-version-10-enables-big-data-engine-support/>, 3 pages.
Notice of Allowance in U.S. Appl. No. 16/853,629, dated Apr. 25, 2022, 9 pages.
archives.microstratey.com [online], "What's New in MicroStrategy 11.0," retrieved on Feb. 13, 2020, retrieved from URL <https://doc-archives.microstrategy.com/producthelp/11.0/Readme/content/whats_new.htm>, 2019, 8 pages.
archives.microstratey.com [online], "How to Use Natural Language Queries," 2019, retrieved on Feb. 13, 2020, retrieved from URL <https://doc-archives.microstrategy.com/producthelp/11.0/Workstation/WebHelp/Lang_1033/Content/nlq.htm>, 2 pages.
Cheng, "Conversing with Your Data Using Natural Language to Boost Self-Service Analytics" MicroStrategy, Jan. 2019, 31 pages.
community.microstrategy.com [online], "KB442148: Natural Language Query in A Nutshell in MicroStrategy Web," Nov. 26, 2019, retrieved on Feb. 13, 2020, retrieved from URL <https://community.microstrategy.com/s/article/Natural-Language-Query-in-A-Nutshell-MicroStrategy-11-0?language-en_US>, 14 pages.
community.microstrategy.com [online], "Natural Language Homepage," Apr. 2017, retrieved on May 26, 2020, retrieved from URL <https://community.microstrategy.com/s/article/Natural-Language-Homepage?language=en_US>, 5 pages.
juvo.be [online], "Gartner Magic Quadrant for Business Intelligence and Analytics Platforms" retrieved May 26, 2020, retrieved from URL <https://www.juvo.be/blog/gartner-magic-quadrant-business-inteiligence-and-analytics-platforms>, Feb. 2013, 53 pages.
microstrategy.com [online], "How to Use Natural Language Queries," Sep. 2018. retrieved on May 26, 2020, retrieved from URL <https://www2.microstrategy.com/producthelp/corrent/MSTRWeb/WebHelp/Lang_1033/Content/nlq.htm>, 2 pages.
microstrategy.com [online], "What's new in MicroStrategy 11.0," 2018, retrieved on Feb. 13, 2020 retrieved from URL <https://www.microstrategy.com/getmedia/93eb0bcc-5aa3-4100-a39d-3f53eb1f73dd/mictostrategy-release-notes_11-0>, 34 pages.
mindmajix.com [online], "MicroStrategy Latest Version (11.0)—New Features," Jan. 2019, retrieved on May 26, 2020, retrieved from URL <https://mindmajix.com/microstrategy-11-0-version-new-features>, 18 pages.
Office Action in U.S. Appl. No. 15/955,541, dated Oct. 8, 2019, 10 pages.
Office Action in U.S. Appl. No. 16/368,282, dated Jun. 10, 2021, 16 pages.
Office Action in U.S. Appl. No. 16/368,282, dated Mar. 2, 2022, 16 pages.
Office Action in U.S. Appl. No. 16/566,339, dated Aug. 31, 2021, 14 pages.
Office Action in U.S. Appl. No. 16/566,339, dated Jan. 18, 2022, 17 pages.
Office Action in U.S. Appl. No. 16/579,392, dated Jan. 7, 2022, 8 pages.
Office Action in U.S. Appl. No. 16/579,392, dated Sep. 15, 2021, 16 pages.
Office Action in U.S. Appl. No. 16/853,629, dated Dec. 8, 2021, 15 pages.
Office Action in U.S. Appl. No. 17/102,996, dated Mar. 24, 2022, 50 pages.
Office Action in U.S. Appl. No. 16/368,282, dated Oct. 20, 2021, 57 pages.
Office Action in U.S. Appl. No. 16/368,282, dated Nov. 9, 2021, 13 pages.
searchbusinessanalytics.techtarget.com [online], "4 ways natural language querying in BI tools can benefit users," Dec. 2018, retrieved on May 26, 2020, retrieved from URL <https://searchbusinessanalytics.techtarget.com/feature/4-ways-natural-language-querying-in-BI-tools-can-benefit-users>, 5 pages.
smartbridge.com [online], "What you need to know about the new and improved MicroStrategy Dossier," Jul. 2019, retrieved on May 26, 2020, retrieved from URL <https://smartbridge.com/what-you-need-to-know-about-the-new-and-improved-microstrategy-dossier/>, 8 pages.
Office Action in U.S. Appl. No. 16/368,282, dated Aug. 5, 2022, 20 pages.
Office Action in U.S. Appl. No. 16/566,339, dated May 11, 2022, 17 pages.
Office Action in U.S. Appl. No. 17/102,996, dated Aug. 12, 2022, 35 pages.

\* cited by examiner

HIGH-THROUGHPUT PARALLEL DATA TRANSMISSION

TECHNICAL FIELD

The present specification relates to data processing techniques, including high-throughput parallel data transmission.

BACKGROUND

As computer technology develops, applications use larger and larger data sets. Data analytics systems in particular often need to import and process data sets that include gigabytes, terabytes, or even petabytes of data. Processing large quantities of data can often require significant amounts of time, even for computers that have significant processing and memory resources.

SUMMARY

In some implementations, a computer system provides a data connector or driver that enables direct access of a computer system, such as an application server, to an unstructured data set, such as a Hadoop big data repository. The data connector can allow an application server to bypass traditional drivers, such as open database connectivity (ODBC) and java database connectivity (JDBC) drivers, and consequently bypass the performance limitations of these drivers. The data connector can be configured to run multiple processing nodes in parallel, with each processing node handling portions of an overall request. The data connector can be arranged so that the processing nodes provide their results in parallel to a destination, e.g., to the application server that provided the request or a different destination specified by the application server. As a result, the output data can be provided with the full combined bandwidth of all of the processing nodes. In addition, the data connector can avoid processing bottlenecks for the output because worker nodes can provide their results directly to the destination without being aggregated or processed by an intermediary node or system.

The data connector can use a variety of optimizations to improve performance. These optimizations include, among other features, the assignment of a management processing node and multiple worker processing nodes. Multiple worker nodes, sometimes a 3, 5, 10, or a dozen or more, can be used to increase the overall bandwidth of the connector. In many cases, the output bandwidth for the data connector scales approximately linearly with the number of worker nodes allocated. In some implementations, the number of worker nodes assigned for processing a task can be determined dynamically based on, for example, the request, the data set(s) the request operates on, a priority for the request, etc.

The processing of worker nodes can be achieved with high performance using file system enhancements. To support a large number of worker nodes, multiple instances (e.g., replicas or copies) of the distributed file system can be provided, with different groups of worker nodes being assigned to obtain data from different instances of the distributed file system. For example, if there are twelve worker nodes allocated for a task, three separate instances of the distributed file system can be used, with four of the worker nodes being assigned to use each instance of the distributed file system. The multiple instances of the distributed file system can each include the same data set, and can operate independently. For example, the different instances can each store separate copies of the data set and can have their own hardware resources allocated.

The data connector can also provide high performance using techniques to assign tasks to the worker nodes in a way that takes advantage of data locality. For example, a management node can identify data in use or cached for different worker nodes, and then assign operations among the worker nodes so that worker nodes can leverage the data they have present. This can avoid causing worker nodes to unnecessarily request data from the distributed file system, and so reduces the overall latency due to data retrieval operations and the number of retrieval requests made to the distributed file system. In a similar manner, when using multiple instances of a file system, data can be cached for each of the file system instances. In this scenario, the system can assign operations to take advantage of data locality in this file-system-level cache in addition. For example, a management node that assigns operations to worker nodes may assign operations based on which instances of the file system are In one general aspect, a method performed by one or more computers includes: providing, by the one or more computers, a data connector module configured to provide an application server with access to a data set of unstructured data; receiving, by the one or more computers and using the data connector module, (i) a first request from the application server, wherein the first request is associated with a first application or service, and (ii) data identifying a second application or service, wherein the second application or service is different from the first application or service; in response to receiving the first request: generating, by the one or more computers, a plurality of second requests; and distributing, by the one or more computers, the second requests to processing nodes to generate results for the second requests; and providing, by the one or more computers, result data derived from the results for the second requests to the second application or service.

Implementations may include one or more of the following features. For example, in some implementations, providing the result data derived from the results for the second requests to the second application or service includes bypassing the first application or service such that the result data is provided to the second application or service without being provided to the first application or service.

In some implementations, the first application or service and the second application or service are provided by different servers.

In some implementations, the one or more computers have a first processing node assigned as a gateway node, and generating and distributing the second requests is performed by the gateway node; and the processing nodes are worker nodes configured to perform data retrieval and/or analysis operations indicated by the respective second requests.

In some implementations, providing the result data includes providing, by the processing nodes, the results for the respective second requests in parallel to the second application or service without aggregation of the results for the second requests by the one or more computers.

In some implementations, the first request is a query, and the results for the second requests comprise results obtained by the respective processing nodes based on different partitions of a distributed file system.

In some implementations, the method includes: providing, by the one or more computers, multiple instances of a distributed file system, each of the instances providing access to a same data set of unstructured data; allocating, by the one or more computers, multiple processing nodes to perform a data processing task, and at least some of the multiple processing nodes are assigned to use different instances of the distributed file system; identifying, by the one or more computers, portions of the data set involved in different operations of the data processing task; and assigning, by the one or more computers, operations of the data processing task to be performed by different nodes of the multiple processing nodes based on (i) the assignment of the processing nodes to the respective instances of the distributed file system and (ii) identified portions of the data set used in previous operations performed by the respective processing nodes.

In some implementations, assigning the operations of the data processing task includes assigning the operations among the multiple processing nodes to process operations that involve shared portions of the data set with processing nodes assigned to the same instance of the distributed file system.

In some implementations, assigning the operations includes: identifying groups of the operations that involve a same portion of the data set; and assigning the groups of operations to be processed by (i) the same node or to (ii) multiple nodes that each use a same instance of the distributed file system.

In some implementations, the method includes generating tracking data indicating which instances of the distributed file system are used to provide portions of the data set used by the processing nodes as the processing nodes perform first operations of the data processing task.

In some implementations, assigning the operations includes, assigning each of one or more second operations involving a particular portion of the data set to be performed by a processing node, from among the multiple processing nodes, that is selected based on the tracking data indicating that the processing node is assigned to a same instance of the distributed file system that was previously used to provide the particular portion of the data set for completing the first operations.

In some implementations, the multiple instances of the distributed file system includes at least three independent instances of the distributed file system.

In some implementations, the distributed file system is a Hadoop Distributed File System or a Bigtable.

In some implementations, assigning the operations includes assigning, for each individual operation of multiple operations, to one of the processing nodes determined to currently store data used in the individual operation.

In some implementations, the data connector module is configured to provide the application server direct access to a distributed file system storing the unstructured data set without an ODBC driver and without a JDBC driver.

In some implementations, the data connector module is configured to operate on the unstructured data set without first importing the data into a data warehouse and without converting the unstructured data set into a structured format.

In another general aspect, a method includes: providing, by the one or more computers, multiple instances of a distributed file system, each of the instances providing access to a same data set of unstructured data; allocating, by the one or more computers, multiple processing nodes to perform a data processing task, wherein at least some of the multiple processing nodes are assigned to use different instances of the distributed file system; identifying, by the one or more computers, portions of the data set involved in different operations of the data processing task; and assigning, by the one or more computers, operations of the data processing task to be performed by different nodes of the multiple processing nodes based on (i) the assignment of the processing nodes to the respective instances of the distributed file system and (ii) identified portions of the data set used in previous operations performed by the respective processing nodes.

Implementations can include one or more of the following features. For example, in some implementations, assigning the operations of the data processing task includes assigning the operations among the multiple processing nodes to process operations that involve shared portions of the data set with processing nodes assigned to the same instance of the distributed file system.

In some implementations, assigning the operations includes: identifying groups of the operations that involve a same portion of the data set; and assigning the groups of operations to be processed by (i) the same node or to (ii) multiple nodes that each use a same instance of the distributed file system.

In some implementations, the method includes generating tracking data indicating which instances of the distributed file system are used to provide portions of the data set used by the processing nodes as the processing nodes perform first operations of the data processing task.

In some implementations, assigning the operations includes, assigning each of one or more second operations involving a particular portion of the data set to be performed by a processing node, from among the multiple processing nodes, that is selected based on the tracking data indicating that the processing node is assigned to a same instance of the distributed file system that was previously used to provide the particular portion of the data set for completing the first operations.

In some implementations, the multiple instances of the distributed file system includes at least three independent instances of the distributed file system.

In some implementations, the distributed file system is a Hadoop Distributed File System or a Bigtable.

In some implementations, assigning the operations includes assigning, for each individual operation of multiple operations, to one of the processing nodes determined to currently store data used in the individual operation.

In some implementations, the data connector module is configured to provide the application server direct access to a distributed file system storing the unstructured data set without an ODBC driver and without a JDBC driver.

In some implementations, the data connector module is configured to operate on the unstructured data set without first importing the data into a data warehouse and without converting the unstructured data set into a structured format.

Other embodiments of these aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
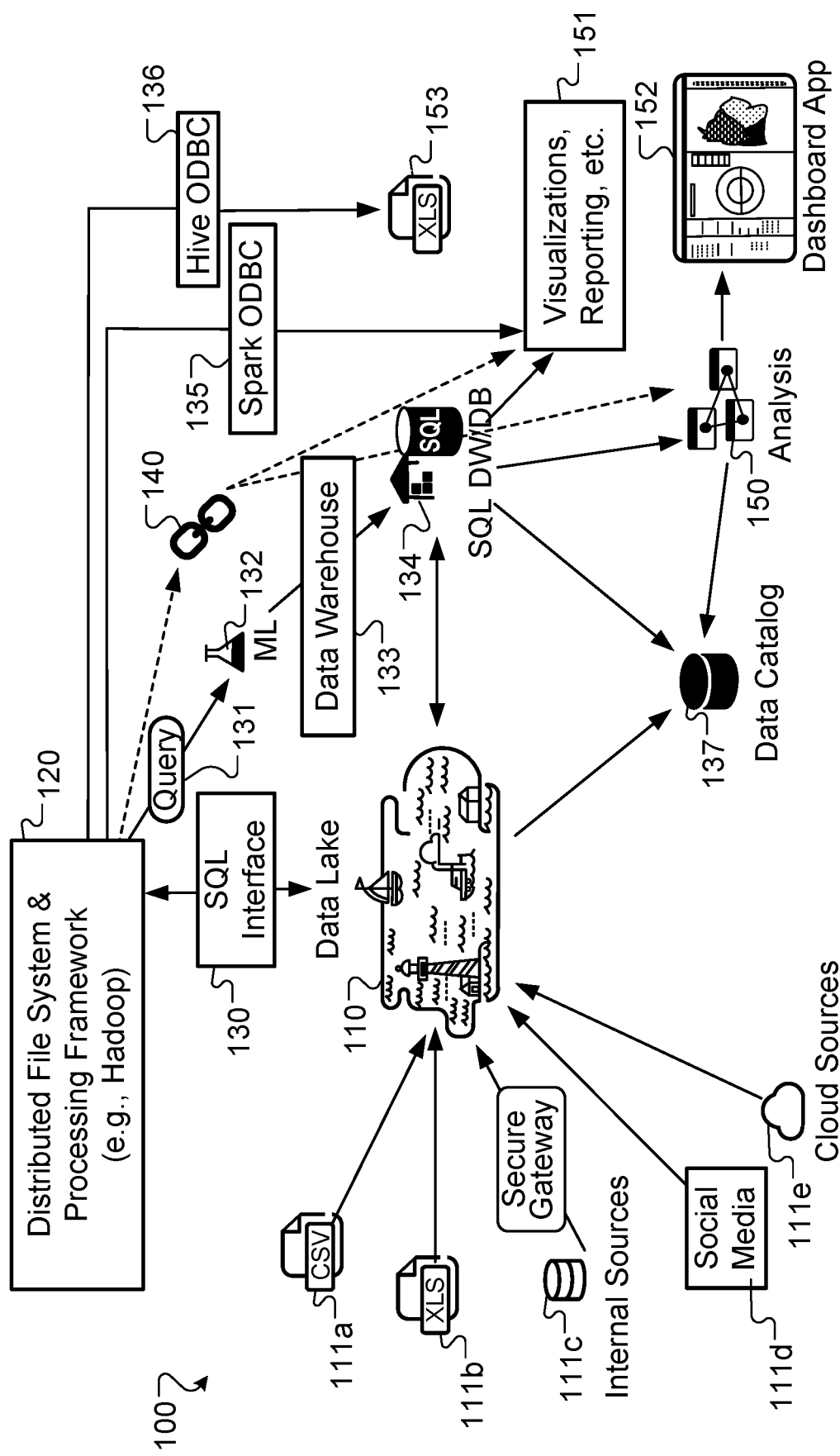
FIG. 1 is a diagram showing an example of a system for high-throughput parallel data transmission.

A computer system can provide a data connector (e.g., a driver or data access gateway) that enables an application, service, server or other system to an unstructured data set, such as a Hadoop big data repository. The data connector can allow an application server to bypass traditional drivers, such as open database connectivity (ODBC) and java database connectivity (JDBC) drivers, and consequently bypass the performance limitations of these drivers. The data connector can be configured to run multiple processing nodes in parallel, with each processing node handling portions of an overall request. The data connector can be arranged so that the processing nodes provide their results in parallel to a destination, e.g., to the application server that provided the request or a different destination specified by the application server. As a result, the output data can be provided with the full combined bandwidth of all of the processing nodes.

Conventional systems for accessing data often required a developer to generate a schema for a project and build models on top of the Hadoop data platform. For example, a Hadoop cluster would store data, which would be processed using MapReduce to provide data to a data warehouse server (e.g., an Apache Hive server). The data from the data warehouse server would then be provided to applications for generating reports, dashboards, and OLAP data cubes through ODBC and JDBC drivers. This framework has a number of limitations. First, the system requires the Hadoop data to be loaded and organized into data warehouse tables before being used, which is a significant and lengthy pre-processing step. Second, data must be accessed from the data warehouse server using the ODBC and JDBC drivers, which present undesirable overhead and bottlenecks in the data pipeline. In many instances, the drivers are single-threaded or single-process modules with limited throughput, causing the drivers to be quickly saturated at a low data rate. Accordingly, traditional SQL-based access resulted in significant throughput limitations and delays, especially for large data sets.

The present specification describes improved techniques including a native connector to allow analysis of unstructured data (e.g., using Hadoop) and provide high-speed parallel data transfer between a file system, e.g., the Hadoop Distributed File System (HDFS), and an application server. The native connector allows the application server to bypass the bandwidth-limited ODBC and JDBC drivers and direct connectivity to the file system (e.g., HDFS) for higher throughput. This allows benefits such as direct file browsing and access to many different file formats. The connector also greatly improves performance over traditional drivers through parallel data loading from the file system. For example, the system can automatically partition a request into several component requests handled by separate worker nodes, and the worker nodes can provide their results in parallel to a destination. In this manner, the destination can receive result data at the combined bandwidth of all of the worker nodes, without imposing any bottleneck of requiring aggregation of the various results first.

Additional advantages of the technique include the ability for users to manage or "wrangle" files in a distributed file system without relying on administrators to manually create a schema first. In addition, the framework can efficiently apply aggregations and filters to the structured data. The techniques allow for different data access modes as well as integration of authentication protocols such as Kerberos.

In some implementations, the native connector is built based using the Apache Spark framework. The connector enables business users to create report models on top of data files directly, instead of requiring reports, dashboards, and other results to be derived from logical tables. This can avoid the need to migrate or convert data from an unstructured format to a structured format of a relational database or a data warehouse. As a result, the native connector can be considered a gateway to unstructured data, making it easy for organizations to natively tap into their Hadoop and other unstructured data assets. For ad-hoc self-service scenarios, where organizations are looking to dynamically generate schema upon reading the data, the native Hadoop connector provides faster parallel data transfer from Hadoop platforms and other unstructured data storage systems.

FIG. 1 is a diagram showing an example of a system 100 for high-throughput parallel data transmission. The system 100 allows data from many different sources to be managed and processed and then output in a variety of forms. The traditional data path involves importing data into a data warehouse or relational database before using the data to generate reports, documents, dashboards, and so on. In addition to this traditional data path, the system 100 provides a data connector module 140 or gateway that can bypass the traditional data warehousing technique. This allows the system 100 to provide data with very high throughput and very low delay for accessing new data sets. Performance gains are achieved by bypassing ODBC and JDBC drivers, as well as the data warehouse pipeline and requirement for an import process. Performance is also increased by allowing parallel data output directly to analysis components, for example, allowing processing nodes to each provide their data to a receiver in parallel, without requiring the result data to be aggregated or processed with an intermediate processing node. In some implementations, application servers and other receivers of data from the connector 140 can be configured with streaming data server components to effectively process the parallel data results received from many worker nodes.

The example of FIG. 1 shows several data sources 111a-111e that each provide data in a data lake 110. The data sources include CSV files XLS files, internal sources 111c such as user profiles and an organizations document library, social media 111d, and cloud sources 111a. Other sources of data can also be used. The data from these sources is not all in a consistent predetermined format. Thus, the data lake 110 represents a large quantity or collection of data that is not structured in a predefined format or database structure. Nevertheless, using a variety of techniques, the data can be analyzed and used or accessed for generating documents, answering queries, and other data processing operations.

In the traditional data flow, a SQL interface 130 receives a query 131 which can then be processed through a data processing pipeline. As one technique for making the data in the data lake 110 available, a distributed file system and processing framework 120, such as Hadoop, is used to provide data to various platform components. The data can be provided to a machine learning module and or a data warehousing module 130 which processes and formats the data into tables of an SQL-enabled data warehouse or database 134. The data warehouse 134 has a pre-defined and usually manually-defined structure and organization. Information about the data from the data lake 110 can also be organized in a data catalog 137, which can store and provide metadata, statistics, and other information. Data from the distributed framework 120 can also provide information accessed through ODBC drivers, such as an Apache Spark ODBC driver, and an Apache Hive ODBC driver 136.

With the data from the ODBC drivers 135 and 136, as well as from the data warehouse 134, data can be provided to analysis engines 150 and other processing engines 151 for generating visualizations, reports, dashboards, and so on.

Separate from the data flow that relies on data warehouses and ODBC drivers, the system 100 provides an alternative data flow path that offers higher performance. The system 100 includes a data connector module 140 that can provide direct access to the distributed file system and processing framework 120. With direct access, the connector 140 avoids the need for a lengthy data import process as well as the need to manually organize data into tables or other schema. Data from the distributed framework 120 can be used directly without traditional pre-processing. One of the advantages is that primary or a unique keys can be identified or modified at the time of executing analysis functions. As illustrated, the connector 140 can provide data directly to the analysis modules 150 and or the other modules 151 for generating visualizations, reports, dashboards, and so on.

The data connector 140 uses multiple worker nodes and to process each request, and the worker nodes each provide their outputs to the receiver or destination corresponding to the current job. A task or job issued in the system 100 can be broken up and distributed among the worker nodes based on the portions of data involved. In some cases, the worker nodes are assigned to perform operations on different portions of a data set, and each worker node provides the retrieval results or analysis results based on its respective portion of the data set. Jobs can be assigned to the worker nodes to take advantage of data locality, where data already present at a worker node can be leveraged for future calculations. In other words, operations using a common portion of the data set are grouped together and assigned on the same worker node or set of worker nodes. Unlike some frameworks, the multiple worker nodes are assigned to process components of a request, and the worker nodes each provide their outputs to the receiver or destination for the current job. Unlike some frameworks, the data connector 140 can be arranged so that the worker nodes do not need to pass their result data through any management node or aggregation step in the connector 140. Rather, the worker nodes can all send their respective result data to the destination directly, which allows the combined throughput of all of the nodes to be used in providing data to the destination. Of course, in some implementations, if desired, an option or mode can be included for the data connector 140 to aggregate or combine data results to support systems that are not configured to receive the parallel output of many worker nodes.

Figure 2:
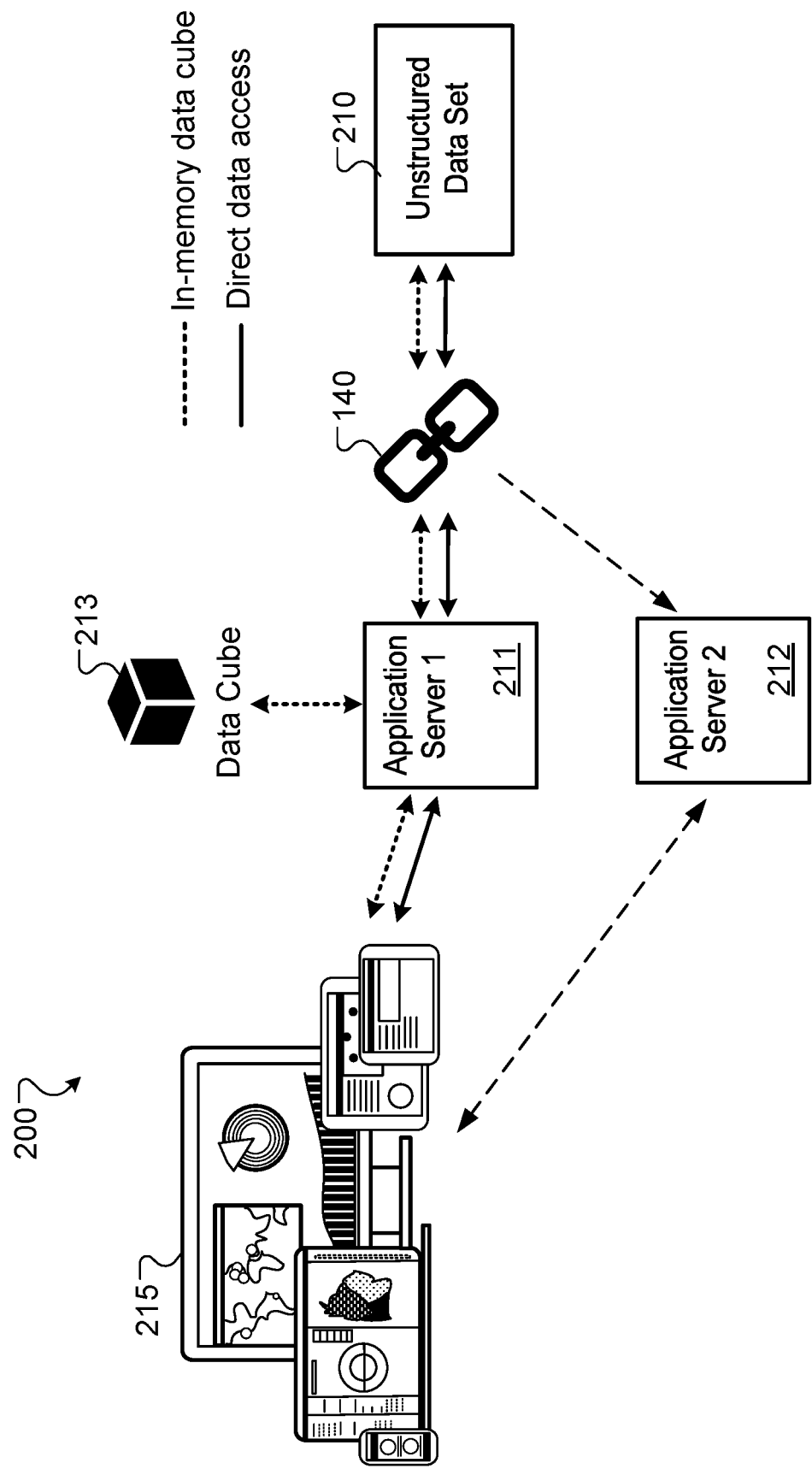
FIG. 2 is a block diagram showing another example of a system for high-throughput parallel data transmission.

FIG. 2 shows an example of a system 204 processing data using the data connector 140. The example of FIG. 2 is simplified relative to FIG. 1, but may nevertheless include components and features as shown in discussed for figure one.

The system 200 has an unstructured data set 210 that is stored and made available using a distributed computing framework, such as Hadoop. The data connector 140 or Hadoop gateway provides data to an application server 211 and receives requests from the application server 211. The application server 211 retrieves data from the connector to create and update a data cube 213. The application server 211 can use the data cube 213, stored in memory such as RAM, to answer queries and populate data of dashboards and other documents and interfaces. In addition, the application server 211 can send requests for data to be used for the same purposes to the connector 140. Thus, the application server 211 can obtain data from the unstructured data set 210 through the connector 144 generating documents, interfaces, and so on separate from the data cube 213 or even without any data cube 213.

The data connector 140 provides various optimizations to improve data transfer. One example is the ability for request to the connector 140 to specify a different destination for the results to the request. For example, the application server 211 can send a request for data to the connector 140 along with an identifier for a different application server 212. Thus the application server 211 can't specify that the application server 212 is the receiver for the request. This avoids the need for a server to obtain data and then have to use its bandwidth to forward the data onto the desired receiver.

Figure 3A:
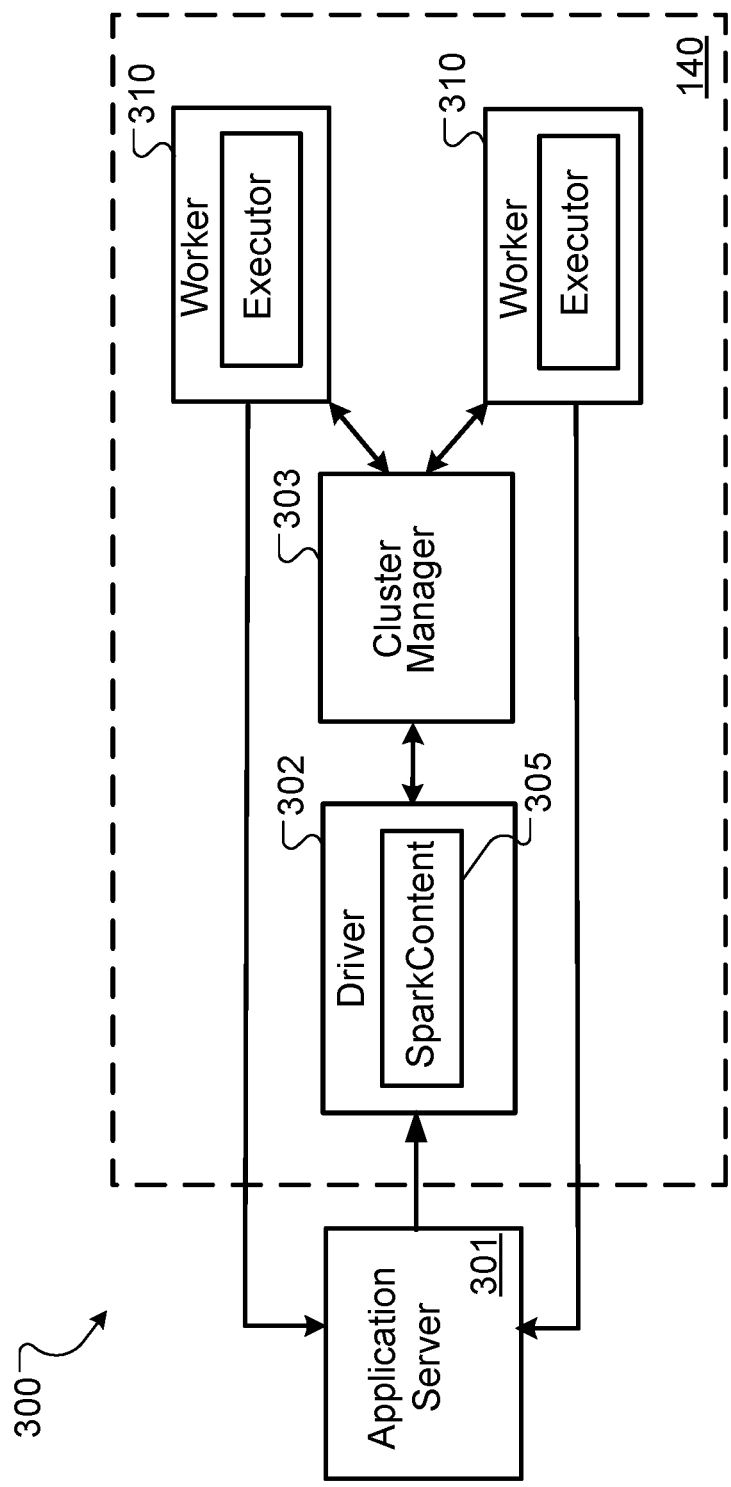
FIGS. 3A-3C is a block diagram showing another example of a system for high-throughput parallel data transmission.

FIG. 3A shows an example of a system 300 that uses the data connector 140 to provide data to an application server 301. The application server 301 provides queries or other requests to a driver element 302 this can include context information, such as a SparkContext object 305 that specifies internal services and establishes a connection to an execution environment. The driver 302 provides appropriately formatted requests to a cluster manager 303, which has the responsibility of dividing the operations for completing a request into component jobs for various worker nodes 310. The cluster manager sends the jobs to the worker nodes for processing, and each worker node 310 uses an executor module or other software to process the portion of the overall task assigned to it. As each worker node 310 completes its portion, the worker node 310 sends the result data to the application server 301. The worker nodes 310 provide their data in parallel and asynchronously with respect to each other. The application server 301, which is the ultimate consumer of the result data in this example, collects and processes the result data from the various workers 310. In this arrangement, the data processing pipeline does not need to aggregate the result data or delay sending the result data before providing it to the application server 301.

Figure 3B:
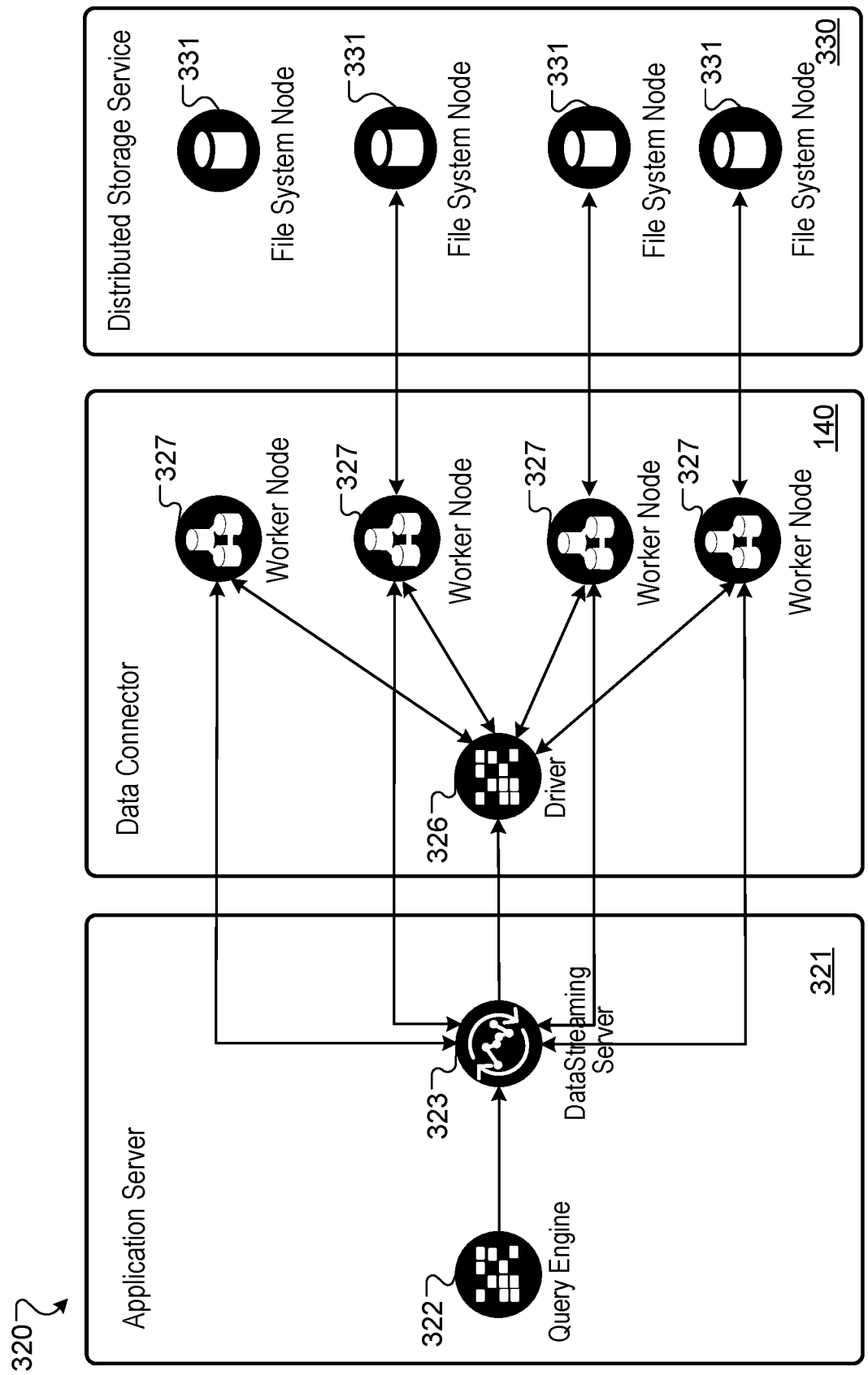

FIG. 3B shows another example of a system 324 high throughput data transmission. FIG. 3B shows additional detail about an application server and operations of worker nodes.

The application server 321 includes a query engine 322 and a data streaming server 323. The query engine 322 provides functionality to receive natural language queries from users and/or structured queries from users or through an application programming interface parentheses API. Queries entered using the query engine 322 are passed on to the data connector 140.

The data connector 140 includes a driver module 326 representing management functions for the overall cluster of nodes used by the connector 140. The driver 326 handles functions such as interpreting queries, generating jobs for the worker nodes 327, assigning the jobs to the worker nodes 327, load balancing, and so on.

The worker nodes 327 each receive different jobs or component tasks as assigned by the driver 326 or management node. The worker nodes communicate with a distributed file system shown as a distributed storage service 330. The service 330 has a number of file system nodes 331. These can represent different processing nodes, processes, virtual machines, or other elements of the distributed storage service 330. And simple implementations, if the file system does 331 may provide data from different portions of the data set being used. For example each of the four file system nodes 331 may provide one quarter of the overall data set. In some implementations, different file system nodes 331 may access different instances of a data set or different data sets. Providing multiple copies or replicas of a data set served by different storage devices or other computing hardware may improve redundancy and reduce bottlenecks. The file system nodes 331 provide requested data to the worker nodes 327. The worker nodes 327 then process the received data, for example, by searching, sorting, filtering, ranking, and so on to generate respective sets of result data. The worker nodes 327 provide their results data to the data streaming server 323 and of the application server 321. The data streaming server at 323 handles the integration of these different result data sets that arrive in parallel and asynchronously with respect to each other. The overall data obtained by the data streaming server 323 is then used for applications and/or services provided by the application server 321, for example, to provide a response to a query, to populate data in a dashboard, to generate a report or other document, and so on.

Figure 3C:
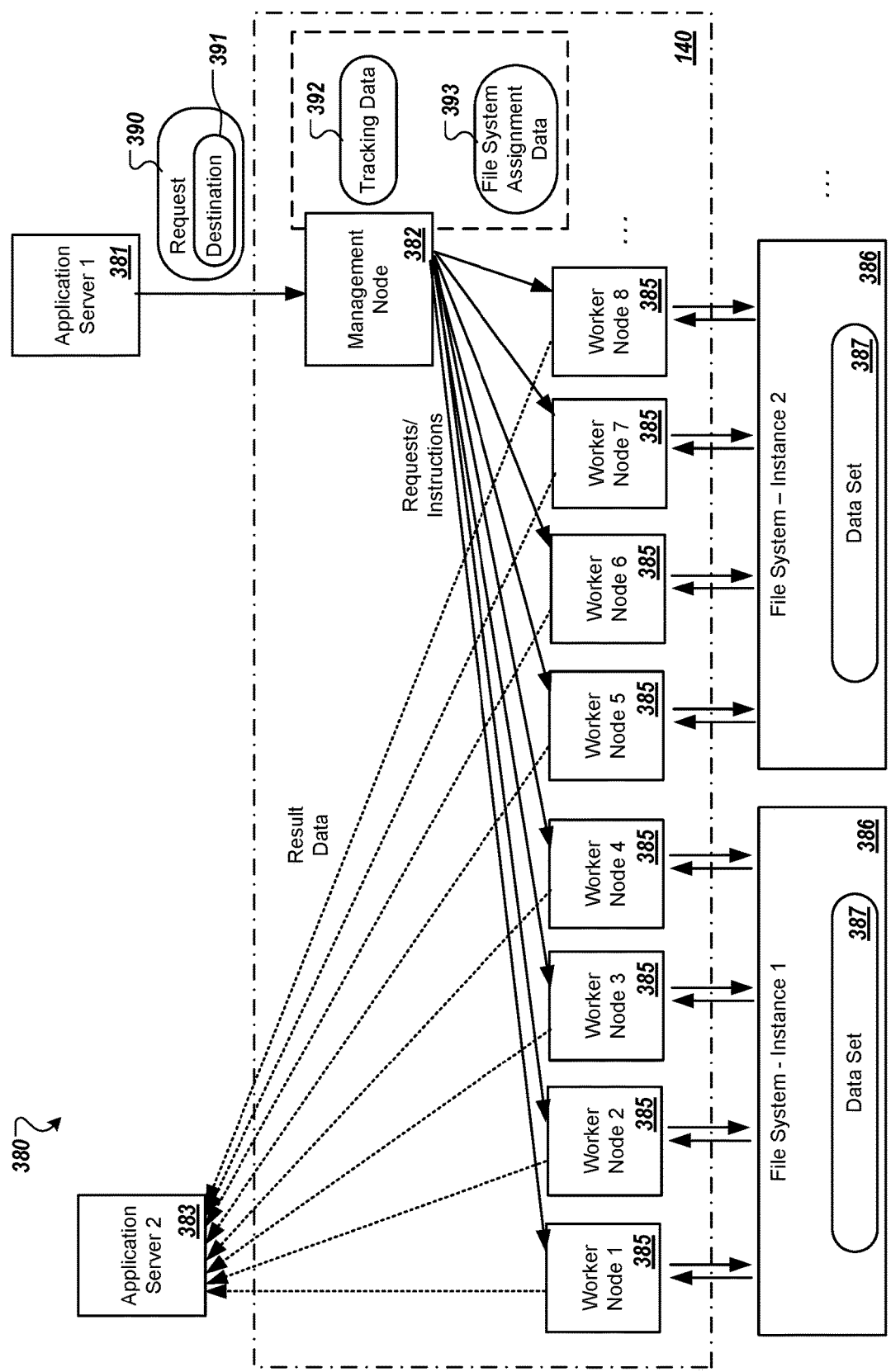

FIG. 3C shows another example of a system 384 high throughput parallel data transmission. The system 380 uses a data connector 140 to receive a request from an application server 381. In the example, the request 390 specifies a destinations 391 for the response that is different from the application server 381 that provided the request 390. For example, the destinations 391 can specify a service, application, server, or other component that did not initiate or provide the request 390. As an example, the application server 381 may receive and process queries from users, and provide appropriate requests to the data connector 140, but specify that the results should be provided directly to a visualization generation application, or a report generation application, or another application or service provided by a different application server 383. In this manner, the application server 381 may handle the initiation of requests to the data connector 140 and cause the result data to be routed to the desired destination without requiring the application server 381 to handle and process the various data streams that result.

In the example of FIG. 3C, the data connector 140 includes a management node 382 that receives the request 390, interprets the request 390, and generates additional requests or instructions for worker nodes 385. The management node 382 manages the assignment of these generated requests to provide efficient usage of the computing resources of the worker nodes 385 as well as two efficiently process the request 390 quickly. In some implementations the number of worker nodes 385 used for a given request 390 can be set or varied dynamically based on the request 390 the conditions determine during processing, available resources, and/or other factors. For example, a request 390 that is determined to be relatively simple or small may be signed across if you were at work or nodes then a larger more complex request 390. Similarly, the management node 382 may take into account the amount of data that will need to be processed to handle the request 390. If their requests or instructions sent to the worker nodes 385 take longer to complete than expected, then the management node 382 may allocate additional worker nodes 385, send requests and instructions that cover a more limited scope of data, or otherwise alter the manner in which the request 390 is distributed among the worker nodes 385.

The management node 382 assigns each of the worker nodes 385 to a file system element. In this example, multiple copies or replicas of the distributed file system are used. There are two file system instances 386 shown, with each file system instance 386 storing a separate copy of the same data set 387. Four of the worker nodes 385 are assigned to use one of the file system instances 386, and the other for worker nodes 385 are assigned to use the other file system instance 386. The use of multiple file system instances 386 helps increase the overall data retrieval bandwidth available to the pool of worker nodes 385.

The management node 382 can monitor the retrieval operations instructed and performed by the various worker nodes 385. The management node 382 stores file system assignment data 393 indicating which worker nodes 385 are assigned to which file system instances 386. Similarly, the management node 382 stores tracking data 392 indicating which portions of the data set 387 are accessed by each individual worker node 385 over time. This allows the management node 382 to divide the jobs or operations to be performed and to assign them to take advantage of data locality. For example, if the management node 382 assigns a specific worker node 385 to perform operations on a certain set of records from the data set, the management node stores tracking data 392 showing the set of records that the worker node 385 has already retrieved. Further operations on that same set of records are routed to the worker node 385 or set of worker nodes 385 that have the data in a local cache already, the overall time for processing the request 390 can be minimized.

Other techniques to take advantage of data locality can also be used. Each of the worker nodes 385 may have an individual working cache to store data retrieved from the data set 387 as well as intermediate results resulting from their processing. The system can also include shared cache is that are accessible by multiple of the worker nodes 385 or even all of the worker nodes 385. As another example each file system instance 386 may have a cache to store recently retrieved or predictively retrieved data from the data set 387. This can allow additional flexibility while maintaining efficient assignment of requests or instructions to the various worker nodes. For example, rather than group all operations including involving a specific set of records with a single worker node 385, the management node 382 may distribute those requests or instructions to Multiple worker nodes 385 that are using the same file system instants 386. Because the cache for the file system instance 386 will include the records retrieved by any of the worker nodes 385 recently, The management node 382 can distribute requests or instructions for that set of records to any of the work are nodes 385 assigned to use that file system instance 386 and still benefit from the reduce latency for retrieval of those records from the cache at the file system instance 386.

Once the worker nodes respectively finish the assigned request for instructions from the management node 382, they provide their processing results to the destination 391 that was specified with the request 390. The management node 382 can direct the worker nodes 385 to provide their result data to the proper destination or receiving component of the system 380. In this example, the destination 391 is an application server 383 that is different from the application server 381 that provided initial request 390. The management now and 382 they specify the destination 391 in any of a variety of ways, for example with an electronica address, our URL, report number, and identifier, or another technique. The destination 391 is an application server 383 that is different from the application server 381 that provided initial request 390. The management now and 382 they specify the destination 391 in any of a variety of ways, for example with an electronica address, our URL, report number, and identify her, or another technique. The worker nodes 385 provide the result data up in parallel to the application server 383.

The parallel transmission of data takes advantage of the full combined bandwidth available from the collection of worker nodes 385. The output throughput of the data connector 140 scales in a roughly linear manner with respect to the number of worker nodes 385 assigned. For example, if each of the worker nodes 385 has a 100 Mb output capability, eight nodes would provide approximately 800 Mb of output bandwidth. When the management node 382 effectively uses their bandwidth at full capacity. The worker nodes 385 communicate with the management node 382 to allow real-time monitoring of performance and loading of individual worker nodes 385. In some instances, some worker nodes 385 may be using their full processing capability but not their output bandwidth, or vice versa. The management node 382 can adjust the types and number of jobs assigned to the respective worker nodes 385 to optimize their output. For example, one worker node 385 may have its computing capacity (e.g., CPU usage) maximized, and so may be constrained to provide much less than its full output bandwidth. In response, the management node 382 may adjust the mix of jobs or operations performed, so that one or more jobs with lower processing requirements but higher output rate may also run, to use the available output bandwidth of the node 385. In a similar manner, if a worker node 385 has available output capacity and processing capacity, for example is experiencing delays due to retrieval from the file system, the management node 382 may reassign the worker node 385 to a different file system instance 386, instruct the worker node 385 to make use of multiple file system instances 386, allocate an additional file system instance 386 or additional hardware for the file system instances 386, and/or assign jobs to take advantage of information cached at the worker node 385 in order to use the processing capability and output capability of the worker node 385 more fully. In some implementations, the worker nodes 385 may be able to share a cache, or access each other's local caches. The management node 382 may track the data stored in the respective caches at some level and be able to instruct worker nodes where additional or alternative sources of data from the data set 387 may be cached for other worker nodes 385.

In some implementations, ten or more worker nodes 385 maybe used by the data connector 140. For example in some implementations, twelve worker nodes 385 are used, and three separate and independent file system instances 386 are used, each instance 386 storing the same data set 387. And some implementations, the data set 387 is read only, which avoids the need to synchronize changes among the data sets due to processing of requests 390. Changes to the data sets 387 may be made in each file system instance 386 through a separate update process, which may involve the data connector 140 or be carried out separate from the connector 140.

Figure 4:
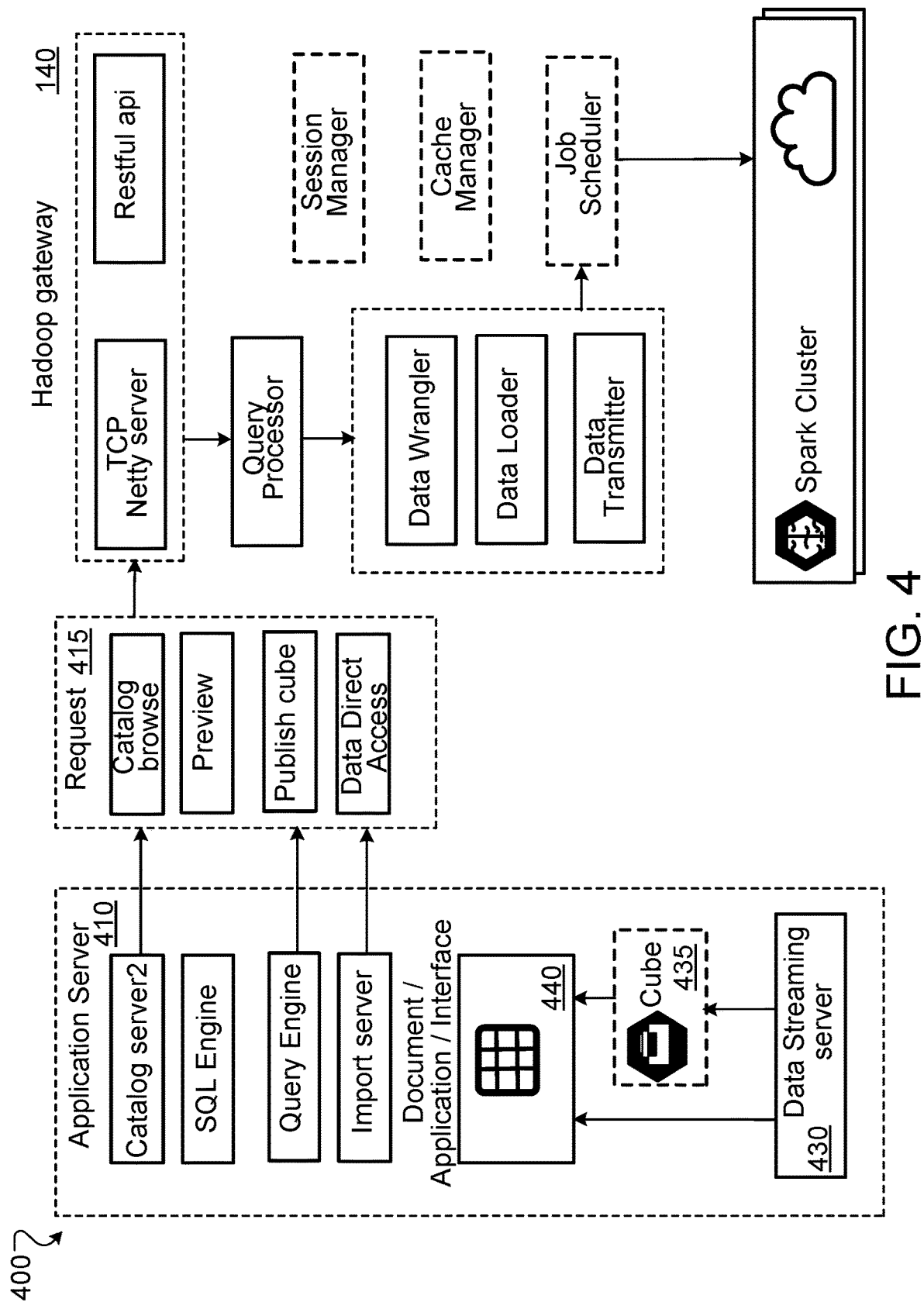
FIG. 4 is a block diagram showing another example of a system for high-throughput parallel data transmission.

FIG. 4 shows another example of a system for providing high throughput parallel data transmission. The system 400 includes an application server 410 that uses a request interface to provide different types of requests 415. The application server 410 may include a different components to generate these requests 415. For example the application server 410 may include a catalog server component that generates queries for browsing a data set in a distributed file system directly. For example, the catalog server may create catalog browse requests or preview requests, for which the resulting data can populate an interface for directly browsing contents of a data set. As another example, the application server could include Generates queries for browsing a data set in a distributed file system directly. For example, the catalog server may create catalog browse requests or preview requests, for which the resulting data can populate an interface for directly browsing contents of a data set. As another example, the application server could include A SQL engine and/or a natural language query engine to receive and process queries. A query engine component can format queries into an appropriate API request to be provided to the data connector 420. As another example, the application server we include an import server element that may generate requests 415 for generating and publishing data cubes, importing data sets, providing direct data access to a data set, and so on.

The requests 415 are provided to the data connector 140. The data connector 140 includes various components to receive and process the request. For example the data connector can include a TCP server, a REST API, and other aspects of an interface to receive and process requests. Received requests are sent to a query processor, which determines the scope and nature of the request 415. This may involve a data wrangler, a data loader, and data transmitter to formulate the types of jobs needed to answer the request 415. The jobs created are then assigned to different worker nodes by a job scheduler. The job scheduler sends jobs to worker nodes in a cluster 425 where worker nodes process their respective jobs and provide results to the application server 410.

Worker nodes in the cluster 425 provide their output in parallel to a data streaming server 430 of the application server 410. Depending on the nature of the request 415, the data streaming server 430 can use the data to create a data cube 435, provide the data to a document, application, or user interface 440, or otherwise use the result data. One of the advantages of this framework is that it allows the application server 410 direct access to the unstructured data set. Requests 415 to support catalog information, previews, and direct data access can be provided very quickly and with high bandwidth.

The data connector 140 can include a session manager to manage multiple concurrently pending sessions, which may be from the same application server or from different application servers. The data connector 140 can also include a cache manager configured to monitor data retrieved and stored for various jobs and take advantage of data locality in the assignment of jobs to worker nodes, as discussed above.

Figure 5:
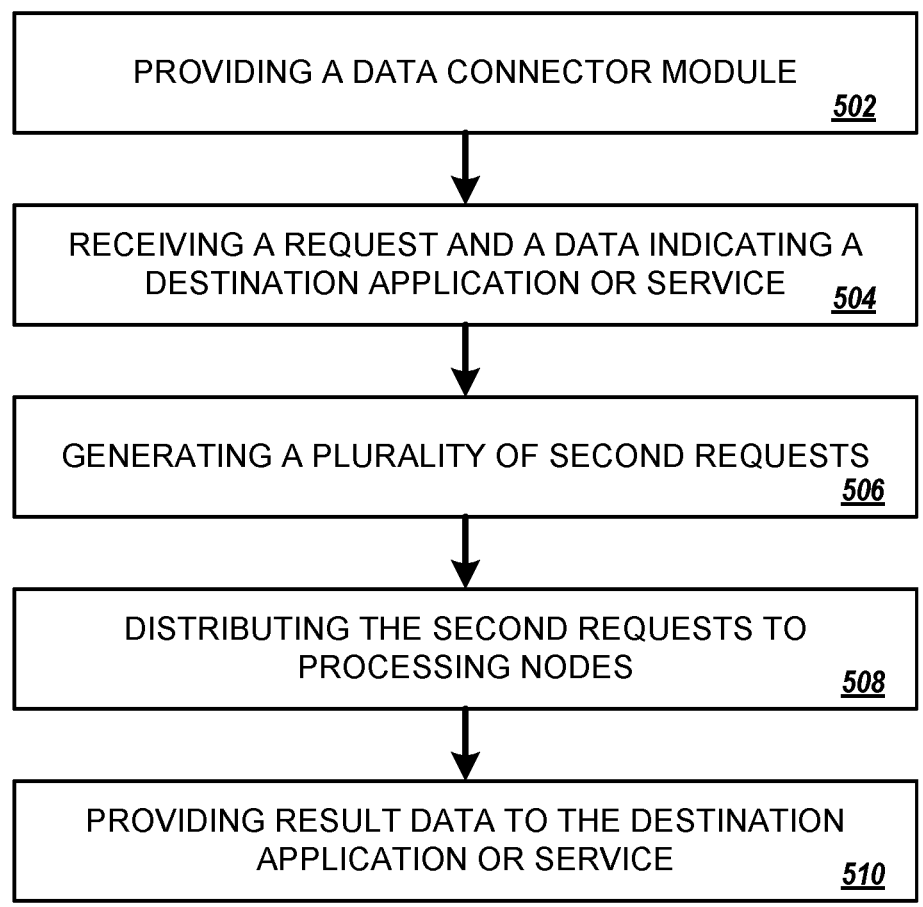
FIG. 5 is a flow diagram showing an example of a process for high-throughput parallel data transmission.
Figure 6:
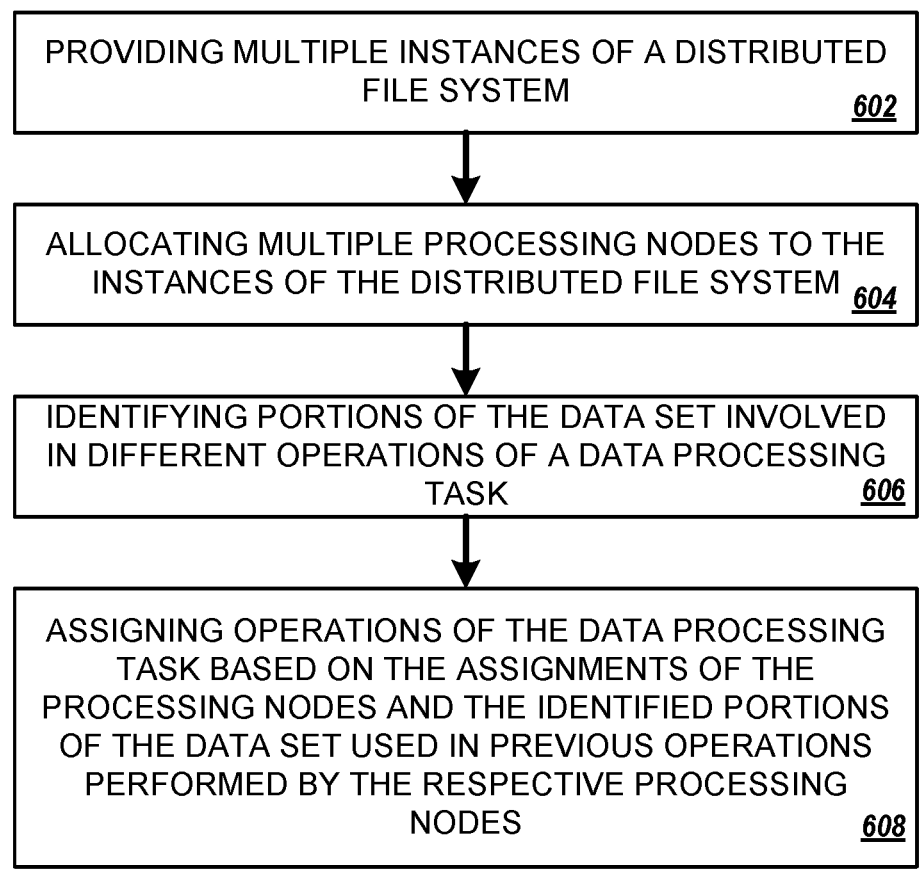
FIG. 6 is another flow diagram showing an example of a process for high-throughput parallel data transmission.

FIGS. 5 and 6 illustrate flow diagrams showing examples of processes for high-throughput parallel data transmission.

FIG. 5 is a flow diagram that illustrates an example of a process 500 for high-throughput parallel data transmission. The process can be performed by one or more computers, including by devices of the systems discussed above.

The one or more computers can provide a data connector module configured to provide an application server or other device with access to a data set of unstructured data (502). The data connector module can be configured to operate on the unstructured data set without first importing the data into a data warehouse and without converting the unstructured data set into a structured format. The data connector module can be configured to provide direct access to a distributed file system storing the unstructured data set without using an ODBC driver and without using a JDBC driver.

The one or more computers can receive data using the data connector module (504). The received data includes (i) a first request associated with a first application or service, and (ii) data identifying a destination application or service. The first request can be from an application server for the first application or service or can be received another device or system (e.g., a client device). The first request can be made using an API, and can be provided over a computer network, such as a local area network, a wide area network, the Internet, and/or other public and/or private networks.

In some implementations, the second application or service is the same as the first application or service. For example, the destination server can be the same server that provided or initiated the first request. In some implementations, the second application or service is different from the first application or service. For example, the destination server can be a different server than the one that provided or initiated the first request.

Various actions 506-510 can be performed in response to receiving the first request. The one or more computers can generate a plurality of second requests (506). The one or more computers can distribute the second requests to processing nodes to generate results for the second requests (508). The one or more computers can have a first processing node assigned as a gateway node. Generating and distributing the second requests can be performed by the gateway node. The processing nodes can be worker nodes configured to perform data retrieval and/or analysis operations indicated by the respective second requests.

The one or more computers can provide result data derived from the results for the second requests to the destination application or service (510). This can include bypassing the first application or service such that the result data is provided to the destination application or service without being provided to the first application or service. As noted above, this can mean responding to the first request by providing result data to a different server than the one that issued the first request. This can occur, for example, when the first application or service and the second application or service are provided by different servers.

In some implementations, providing the result data includes providing, by the processing nodes, the results for the respective second requests in parallel to the second application or service without aggregation of the results for the second requests by the one or more computers.

In some implementations, the first request is a query, and the results for the second requests comprise results obtained by the respective processing nodes based on different partitions of a distributed file system.

FIG. 6 is a flow diagram that illustrates an example of a process 600 for high-throughput parallel data transmission. The process can be performed by one or more computers, including by devices of the systems discussed above. The process 600 can be used with process 500 or on its own.

The one or more computers can provide multiple instances of a distributed file system (602). Each of the instances can provide access to a same data set of unstructured data.

The one or more computers can allocate multiple processing nodes to perform a data processing task (604). At least some of the multiple processing nodes are assigned to use different instances of the distributed file system. The multiple instances of the distributed file system can include at least three independent instances of the distributed file system. The distributed file system can be a Hadoop Distributed File System or a Bigtable.

The one or more computers can identify portions of the data set involved in different operations of the data processing task (606).

The one or more computers can assign operations of the data processing task (e.g., the respective second requests of FIG. 5) to be performed by different nodes of the multiple processing nodes (608). The assignment of operations can be based on (i) the assignment of the processing nodes to the respective instances of the distributed file system and (ii) identified portions of the data set used in previous operations performed by the respective processing nodes.

The assignment can be performed to take advantage of data locality and caching to improve throughput and efficiency of the system. For example, processing nodes assigned to the same instance of the distributed file system can be assigned operations that involve the same portions of the data set with system. As a result the particular instance of the distributed file system may be able to retrieve a portion of the data set from source devices once, and then use the retrieved portion of the data set to support multiple assigned operations with reduced latency.

In some implementations, assigning the operations includes: identifying groups of the operations that involve a same portion of the data set; and assigning the groups of operations to be processed by (i) the same node or to (ii) multiple nodes that each use a same instance of the distributed file system.

In some implementations, the one or more computers generate tracking data indicating which instances of the distributed file system are used to provide portions of the data set used by the processing nodes. This tracking can be performed as the processing nodes perform first operations of the data processing task. Then, the one or more computers can use the tracked access and usage data to assign second operations for efficient processing. For example, the one or more computers can assign one or more second operations, which each involving a same particular portion of the data set, to be performed by respective processing nodes from among the multiple processing nodes. The processing nodes can be selected to perform the second operations based on the tracking data indicating that the processing nodes are each assigned to a same instance of the distributed file system. For example, they can be selected based on determining that the particular instance of the distributed file system to which the processing nodes are assigned was previously used to provide the particular portion of the data set for completing the first operations or other recent operations. Typically, the system performs tracking within a session or overall processing to respond to the first request. Nevertheless, in some implementations, data locality and assignment in this manner can span the processing of multiple application server requests, either for multiple requests from a same application server or even over requests from different application servers.

In some implementations, assigning the operations includes assigning an operation to one of the processing nodes determined to currently store data used in the individual operation. In this manner, the assignment of operations (e.g., second requests as in the process 500) can take into account data locality of the processing nodes, additionally or alternatively to using data locality at the different instances of the distributed file system to assign operations.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A method performed by one or more computers, the method comprising:
    providing, by the one or more computers, a data connector module configured to provide, to an application server, access to a data set of unstructured data;
    receiving, by the one or more computers and using the data connector module, a first request from the application server, wherein the first request is initiated by or provided by a first application or service, and wherein the first request specifies a second application or service to receive results generated in response to the first request, wherein the second application or service is different from the first application or service;
    in response to receiving the first request using the data connector module:
        generating, by the one or more computers, a plurality of second requests at a management node of the data connector module; and
        distributing, by the one or more computers, the second requests from the management node to processing nodes of the data connector module such that the processing nodes generate results for the second requests; and
    providing, by the one or more computers, the results for the second requests from the processing nodes to the second application or service specified in the first request, wherein the processing nodes separately provide their respective results in parallel to the second application or service specified in the first request.

2. The method of claim 1, comprising:
    providing, by the one or more computers, multiple instances of a distributed file system, each of the instances providing access to a same data set of unstructured data;
    allocating, by the one or more computers, multiple processing nodes to perform a data processing task, wherein at least some of the multiple processing nodes are assigned to use different instances of the distributed file system;
    identifying, by the one or more computers, portions of the data set involved in different operations of the data processing task; and
    assigning, by the one or more computers, operations of the data processing task to be performed by different nodes of the multiple processing nodes based on (i) the assignment of the processing nodes to the respective instances of the distributed file system and (ii) identified portions of the data set used in previous operations performed by the respective processing nodes.

3. The method of claim 2, wherein assigning the operations of the data processing task comprises assigning the operations among the multiple processing nodes to process operations that involve shared portions of the data set with processing nodes assigned to the same instance of the distributed file system.

4. The method of claim 2, wherein assigning the operations comprises:
    identifying groups of the operations that involve a same portion of the data set; and
    assigning the groups of operations to be processed by (i) the same node or to (ii) multiple nodes that each use a same instance of the distributed file system.

5. The method of claim 2, comprising generating tracking data indicating which instances of the distributed file system are used to provide portions of the data set used by the processing nodes as the processing nodes perform first operations of the data processing task;
    wherein assigning the operations comprises, assigning each of one or more second operations involving a particular portion of the data set to be performed by a processing node, from among the multiple processing nodes, that is selected based on the tracking data indicating that the processing node is assigned to a same instance of the distributed file system that was previously used to provide the particular portion of the data set for completing the first operations.

6. The method of claim 2, wherein the multiple instances of the distributed file system comprises at least three independent instances of the distributed file system.

7. The method of claim 2, wherein the distributed file system is a Hadoop Distributed File System or a Bigtable.

8. The method of claim 2, wherein the each of the processing nodes has a local cache;
    wherein the method includes:
        identifying portions of the data set used in the respective operations of the different operations of the data processing task; and
        determining which of the identified portions of the data set are included in the respective local caches of the processing nodes; and
    wherein assigning the operations comprises assigning, for each operation of at least some of the different operations of the data processing task, the operation to be performed by one of the processing nodes that has a local cache determined to currently store one of the identified portions of the data set used in the operation.

9. The method of claim 1, wherein the first application or service is provided by the application server and the second application or service is provided by a second server that is different from the application server, and
    wherein the first request is provided to the data connector module by the application server and the first request designates the second application or service provided by the second server as a destination to receive results of the first request.

10. The method of claim 1,
    wherein the processing nodes are worker nodes configured to perform data retrieval and/or analysis operations indicated by the respective second requests.

11. The method of claim 1, wherein providing the results providing, by the processing nodes, the results for the respective second requests in parallel to the second application or service, wherein the results are provided to the second application or service without aggregation of the results from the respective processing nodes before the results reach the second application or service.

12. The method of claim 1, wherein the first request is a query, wherein the results for the second requests comprise results obtained by the respective processing nodes based on different partitions of a distributed file system.

13. The method of claim 1, wherein the data connector module is configured to operate on the unstructured data set without first importing the data into a data warehouse and without converting the unstructured data set into a structured format.

14. The method of claim 1, wherein providing the results comprises providing the results in multiple concurrent data streams of result data from the processing nodes to the second application or service.

15. A system comprising:
one or more computers; and
one or more computer-readable media storing instructions that, when executed by the one or more computers, cause the one or more computers to perform operations comprising:
providing, by the one or more computers, a data connector module configured to provide, to an application server, access to a data set of unstructured data;
receiving, by the one or more computers and using the data connector module, a first request from the application server, wherein the first request is initiated by or provided by a first application or service, and wherein the first request specifies a second application or service to receive results generated in response to the first request, wherein the second application or service is different from the first application or service;
in response to receiving the first request using the data connector module:
generating, by the one or more computers, a plurality of second requests at a management node of the data connector module; and
distributing, by the one or more computers, the second requests from the management node to processing nodes of the data connector module such that the processing nodes generate results for the second requests; and
providing, by the one or more computers, the results for the second requests from the processing nodes to the second application or service specified in the first request, wherein the processing nodes separately provide their respective results in parallel to the second application or service specified in the first request.

16. The system of claim 15, wherein the first application or service is provided by the application server and the second application or service is provided by a second server that is different from the application server; and wherein the first request is provided to the data connector module by the application server and the first request designates the second application or service provided by the second server as a destination to receive results of the first request.

17. The system of claim 15,
wherein the processing nodes are worker nodes configured to perform data retrieval and/or analysis operations indicated by the respective second requests.

18. One or more non-transitory computer-readable media storing instructions that, when executed by the one or more computers, cause the one or more computers to perform operations comprising:
providing, by the one or more computers, a data connector module configured to provide, to an application server, access to a data set of unstructured data;
receiving, by the one or more computers and using the data connector module, a first request from the application server, wherein the first request is initiated by or provided by a first application or service, and wherein the first request specifies a second application or service to receive results generated in response to the first request, wherein the second application or service is different from the first application or service;
in response to receiving the first request using the data connector module:
generating, by the one or more computers, a plurality of second requests at a management node of the data connector module; and
distributing, by the one or more computers, the second requests from the management node to processing nodes of the data connector module such that the processing nodes generate results for the second requests; and
providing, by the one or more computers, the results for the second requests from the processing nodes to the second application or service specified in the first request, wherein the processing nodes separately provide their respective results in parallel to the second application or service specified in the first request.

* * * * *